US012618947B2

(12) United States Patent (10) Patent No.: US 12,618,947 B2
Pothier et al. (45) Date of Patent: May 5, 2026

(54) ANTI FLICKER FILTER FOR dToF SENSOR

(71) Applicant: STMicroelectronics France, Montrouge (FR)

(72) Inventors: Olivier Pothier, Sceaux (FR); Victor Macela, Paris (FR); Thierry Lebihen, Bourg la Reine (FR); Arnaud Bourge, Paris (FR)

(73) Assignee: STMicroelectronics France, Montrouge (FR)

( * ) Notice: Subject to any disclaimer, the term of this patent is extended or adjusted under 35 U.S.C. 154(b) by 975 days.

(21) Appl. No.: 17/655,727

(22) Filed: Mar. 21, 2022

(65) Prior Publication Data

US 2022/0308173 A1 Sep. 29, 2022

(30) Foreign Application Priority Data

Mar. 25, 2021 (FR) ...................................... 2103003

(51) Int. Cl.
*G01S 7/48* (2006.01)
*G01S 7/487* (2006.01)
*G01S 17/89* (2020.01)

(52) U.S. Cl.
CPC .......... *G01S 7/4808* (2013.01); *G01S 7/4876* (2013.01); *G01S 17/89* (2013.01)

(58) Field of Classification Search
CPC ...... G01S 7/4808; G01S 7/4876; G01S 17/89; G01S 7/497; G01S 7/487; G01S 17/04; G01S 17/66; G01S 7/4865; G01S 7/481; G01S 7/483; G01S 7/495; G01S 17/08; G01S 17/93
See application file for complete search history.

(56) References Cited

U.S. PATENT DOCUMENTS

| | | | |
|---|---|---|---|
| 9,918,041 B1 | 3/2018 | Zhang et al. | |
| 2012/0050074 A1 | 3/2012 | Bechtel et al. | |
| 2014/0054455 A1* | 2/2014 | Suarez .................. | G04F 10/005 |
| | | | 341/166 |
| 2014/0177915 A1 | 6/2014 | Fan et al. | |

(Continued)

FOREIGN PATENT DOCUMENTS

| | | | | |
|---|---|---|---|---|
| CN | 110823368 A | 2/2020 | | |
| EP | 0660135 | * 6/1995 | ........... | G01S 13/931 |

(Continued)

*Primary Examiner* — Alexander Satanovsky

(74) *Attorney, Agent, or Firm* — Slater Matsil, LLP

(57) ABSTRACT

Method, having detecting from a first histogram signal delivered by a sensor device, successive sets of targets at respective successive instants, determining for a current set of current detected targets, a current histogram output, the current histogram output having for each current detected target of the current set, a current group of parameters stored in a memory including a confidence indicator, performing a matching operation between the current set of detected targets and previous sets of detected targets stored in the memory, and performing a filtering operation of at least one parameter of the current group of parameters of at least some of the current detected targets of the current set, on the basis of the result of the matching operation, the filtering operation being weighted on the basis of at least the confidence indicators of current and previous sets of detected targets.

31 Claims, 13 Drawing Sheets

(56)         References Cited

U.S. PATENT DOCUMENTS

| 2017/0290550 A1* | 10/2017 | Perschbacher ......... A61B 5/076 |
| 2018/0156928 A1 | 6/2018 | Tsuda |
| 2018/0253404 A1* | 9/2018 | Moore ................ G06F 11/0703 |
| 2019/0130994 A1* | 5/2019 | Ruderman ............. G16B 40/10 |
| 2019/0238155 A1* | 8/2019 | Liu ................... H04L 25/03343 |
| 2020/0052694 A1 | 2/2020 | Moore |
| 2022/0191402 A1* | 6/2022 | Winterton .............. H04N 23/61 |

FOREIGN PATENT DOCUMENTS

| EP | 0660135 A2 | 6/1995 |
| EP | 0660135 A3 | 7/1996 |
| EP | 3690475 A1 | 8/2020 |

* cited by examiner

FIG.7

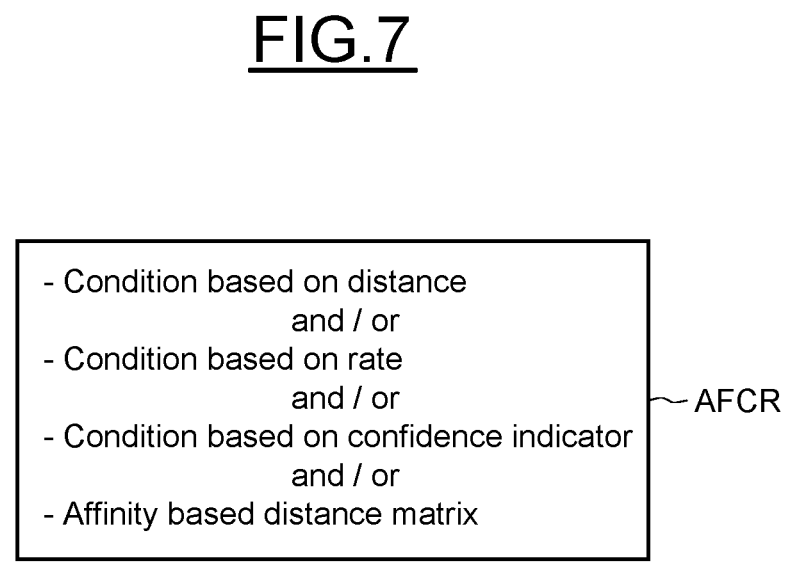

- Condition based on distance
  and / or
- Condition based on rate
  and / or
- Condition based on confidence indicator
  and / or
- Affinity based distance matrix $\sim$ AFCR

FIG.13

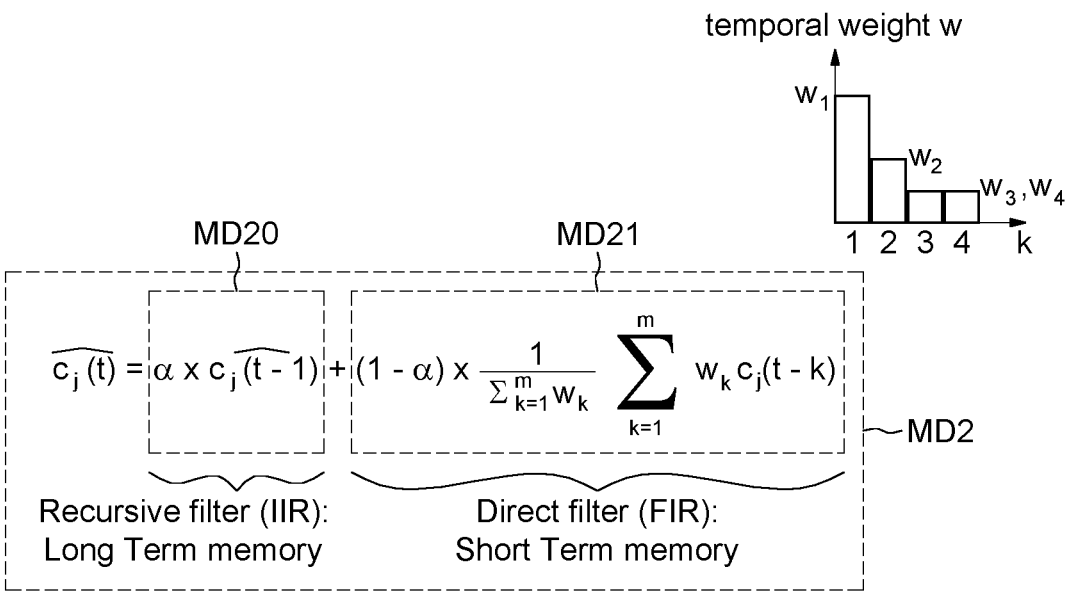

MD20                    MD21

$$\widehat{c_j(t)} = \alpha \times \widehat{c_j(t-1)} + (1-\alpha) \times \frac{1}{\sum_{k=1}^{m} w_k} \sum_{k=1}^{m} w_k c_j(t-k)$$

~MD2

Recursive filter (IIR):        Direct filter (FIR):
Long Term memory               Short Term memory

FIG.14

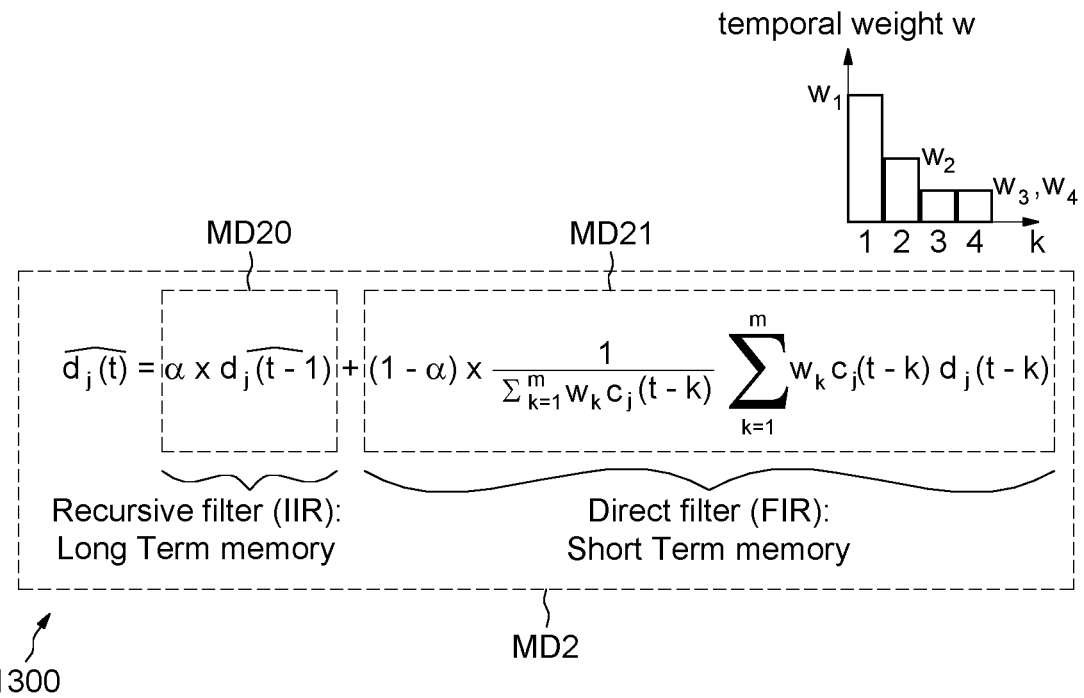

MD20                    MD21

$$\widehat{d_j(t)} = \alpha \times \widehat{d_j(t-1)} + (1-\alpha) \times \frac{1}{\sum_{k=1}^{m} w_k c_j(t-k)} \sum_{k=1}^{m} w_k c_j(t-k) \, d_j(t-k)$$

Recursive filter (IIR):        Direct filter (FIR):
Long Term memory               Short Term memory

MD2

1300

ANTI FLICKER FILTER FOR dToF SENSOR

CROSS-REFERENCE TO RELATED APPLICATIONS

This application claims priority to French Application No. 2103003, filed on Mar. 25, 2021, which application is hereby incorporated by reference herein in its entirety.

TECHNICAL FIELD

The present disclosure generally relates to Time-of-Flight (ToF) and, in particular embodiments, to an anti-flicker filter used in ToF devices.

BACKGROUND

Devices for determining distance (or range) to objects or targets are known. One such method is called "Time of Flight" (ToF), which includes sending a light signal towards the object and measuring the time taken by the signal to travel to the object and travel back to the device.

Direct Time of Flight (dToF) devices directly measure the time taken by the signal to travel to the object and travel back to the device. Indirect Time of Flight (iToF) devices calculate the time the signal takes to travel by measuring the phase shift between the signal coming out of the light source and the signal reflected from the object and detected by a light sensor—knowing this phase shift and the speed of light enables the determination of the distance to the object.

Single-photon avalanche diodes (SPAD) may be used to detect reflected light. In general, an array of SPADs is provided as a sensor to detect a reflected light pulse. A photon may generate a carrier in the SPAD through the photoelectric effect. The photo-generated carrier may trigger an avalanche current in one or more of the SPADs in the SPAD array. The avalanche current may signal an event, namely that a photon of light has been detected.

Time-of-Flight histogram processing aims to detect objects (targets) in the Field-of-View of the device and estimate their distances to the sensor. This processing (Histogram Pipe "HIP") is embedded into the ToF sensor firmware (FW), and it can be used by a Smartphone to drive its Camera AutoFocus.

For example, the HIP uses a statistical hypothesis test to determine the presence of potential targets in the field of view: it is the role of a Pulse Segmenter ("PS") or pulse detector. The PS finds statistically significant pulses in the Histograms reported by the hardware (HW) of the ToF (for example, dToF) sensor. Due to the statistical nature of this detection process and the Photonic noise, targets can "flicker" (i.e., they can be detected at one instant), then lost at the next one, then come back.

The flicker is inherent to the technology. Flicker is a temporal effect when the signal bounced by the target is close to the detectability threshold because (i) the target is far away, (ii) the target reflectance is low, or (iii) the target is only covering a small part of the Field of View (FoV) (of one sensor's zone). This is known as a type 1 flicker.

Some other types of flicker may occur, such as "Competition" of several targets with equivalent signals when one only has to be reported (type 2), or close targets can be reported successively either as separated or merged (type 3)

Several tracks have been followed to reduce the flicker effects. A first track tries to avoid the issue by avoiding statistical detection when not required. However, it is not possible in all cases because AutoFocus requires target distance identification. A second track tries to face the issue using a hysteresis filter (dynamic adaptation of the PS threshold), which reduces the temporal effect but does not remove it. The "curse of Threshold" remains, and it does not solve flickers of types greater than 1. Further, a latency is introduced. A third track tries to face the issue by using and exploiting spatial correlation. But it is not possible in all cases, for example, for Single Zone Sensor, and there is further a loss in (X, Y) resolution.

SUMMARY

According to embodiments, a flicker filtering method and system having the following advantages is proposed: (i) tight hardware coupling for target confidence computation (done in the firmware), (ii) the Anti Flicker Filter (AFF) allows to drastically reduce the flicker at the output of the Histogram Pipe, (iii) keeping the latency to a reasonable level, (iv) tunable trade-off between the stability and the latency, (v) smoothly handling multiple targets, (vi) detecting False Long Tail targets, (vii) not reducing the spatial resolution (nor making an assumption on the scene).

According to embodiments, it is proposed to use a confidence measure on the detected targets. This confidence measure is advantageously computed within the HIP, in FW, using HW histograming counters by performing a temporal filtering (for taking into account the temporal effect of the flickering) with a "short term" memory (Direct part) and a "long term" memory (Feedback part) using weights of the filter having a dynamic and double influence and giving more importance to more recent past than older (temporal influence) and giving more importance to more confident data (confidence influence), dealing with missing targets for "filling" the holes in the filter input, taking into account the previous confidence on the target, performing a potential Targets database (memory) management, and using an "Affinity" criterion to cope with multiple targets.

According to an aspect, a method includes detecting from a first histogram signal (raw histogram) delivered by a sensor device, successive sets of targets at respective instants; determining for a current set of current detected targets a current histogram output, the current histogram output having for each current detected target of the current set a current group of parameters stored in memory including a confidence indicator; performing a matching operation between the current set of detected targets and previous sets of detected targets stored in the memory; and performing a temporal filtering operation of at least one parameter of the current group of parameters of at least some of the current detected targets of the current set on the basis of the result of the matching operation, the temporal filtering operation being advantageously weighted based on at least the confidence indicators of current and previous sets of detected targets.

The temporal filtering operation may be performed, for example, but not limited to, by using an IIR filter (i.e., the parameters in the memory may be obtained from previous input targets or from previously filtered output ones). Other types of filters may be used, for example, an FIR filter.

The confidence indicator of a current detected target may be based on the Z-score of the target in the first histogram signal (raw histogram).

According to an embodiment, a current group of parameters includes a rate, an ambient rate, and a distance (range).

According to an embodiment, the matching operation includes using an affinity condition.

According to an embodiment, the affinity condition includes a condition based on distance (range).

According to an embodiment, the affinity condition includes a condition based on rate.

According to an embodiment, the affinity condition includes a condition based on the confidence indicator.

According to an embodiment, the affinity condition includes an affinity-based distance matrix.

According to an embodiment, a current detected target matches one previous target stored in the memory at the end of the matching operation.

According to an embodiment, a current detected target does not match any previous target stored in the memory at the end of the matching operation.

In such a case, the current detected target may be added to the memory if empty slots are available.

As a variant, a selective memory replacement may be performed based on the confidence indicators for storing the current detected target.

According to an embodiment, a previous target in the memory is not matched in the current set of detected targets. A new target («virtual» target) is added to the input of the filtering operation with a new confidence indicator.

The new confidence indicator may be very low if one is very confident on its corresponding previous target.

The new confidence indicator may be close to the previous confidence indicator if the previous confidence indicator is low.

According to an embodiment, the method includes a double-weighted filtering operation based on the target parameters and the confidence indicator.

The sensor device may include a ToF device, particularly a dToF device.

According to another aspect, a system is proposed, having a sensor device configured to deliver a first histogram signal permitting to detect successive sets of targets at respective successive instants; first processor configured to determine, for a current set of current detected targets, a current histogram output, the current histogram output having for each current detected target of the current set, a current group of parameters stored in memory including a confidence indicator; second processor configured to perform a matching operation between the current set of detected targets and previous sets of detected targets stored in the memory, and a temporal filtering operation of at least one parameter of the current group of parameters of at least some of the current detected targets of the current set, based on the result of the matching operation, the temporal filtering operation being advantageously weighted based on at least the confidence indicators of current and previous sets of detected targets.

The different features indicated above for the different embodiments of the method defined above may be incorporated into different embodiments of the system.

Further, according to a preferred embodiment, the first and second processors may be implemented as firmware.

As a variant, the first processor includes a first circuit configured to determine the confidence indicators and a second circuit configured to determine the other parameters. The first circuit and the second processor are implemented as software, and the second circuit is implemented as firmware.

BRIEF DESCRIPTION OF THE DRAWINGS

For a more complete understanding of the present disclosure and the advantages thereof, reference is now made to the following descriptions taken in conjunction with the accompanying drawings, in which:

FIG. 7 is an embodiment for an affinity criterion requirements;

FIG. 13 is a diagram of an embodiment weighted filtering operation;

FIG. 14 is a diagram of an embodiment double-weighted filtering operation;

DETAILED DESCRIPTION OF ILLUSTRATIVE EMBODIMENTS

In various embodiments, Time-of-Flight (ToF) devices may refer to either direct Time-of-Flight (dToF) or indirect Time-of-Flight (iToF) type devices, unless stated otherwise. An advantageous application, but not limited to such application, is a range estimation for AutoFocus Assist.

Figure 1:
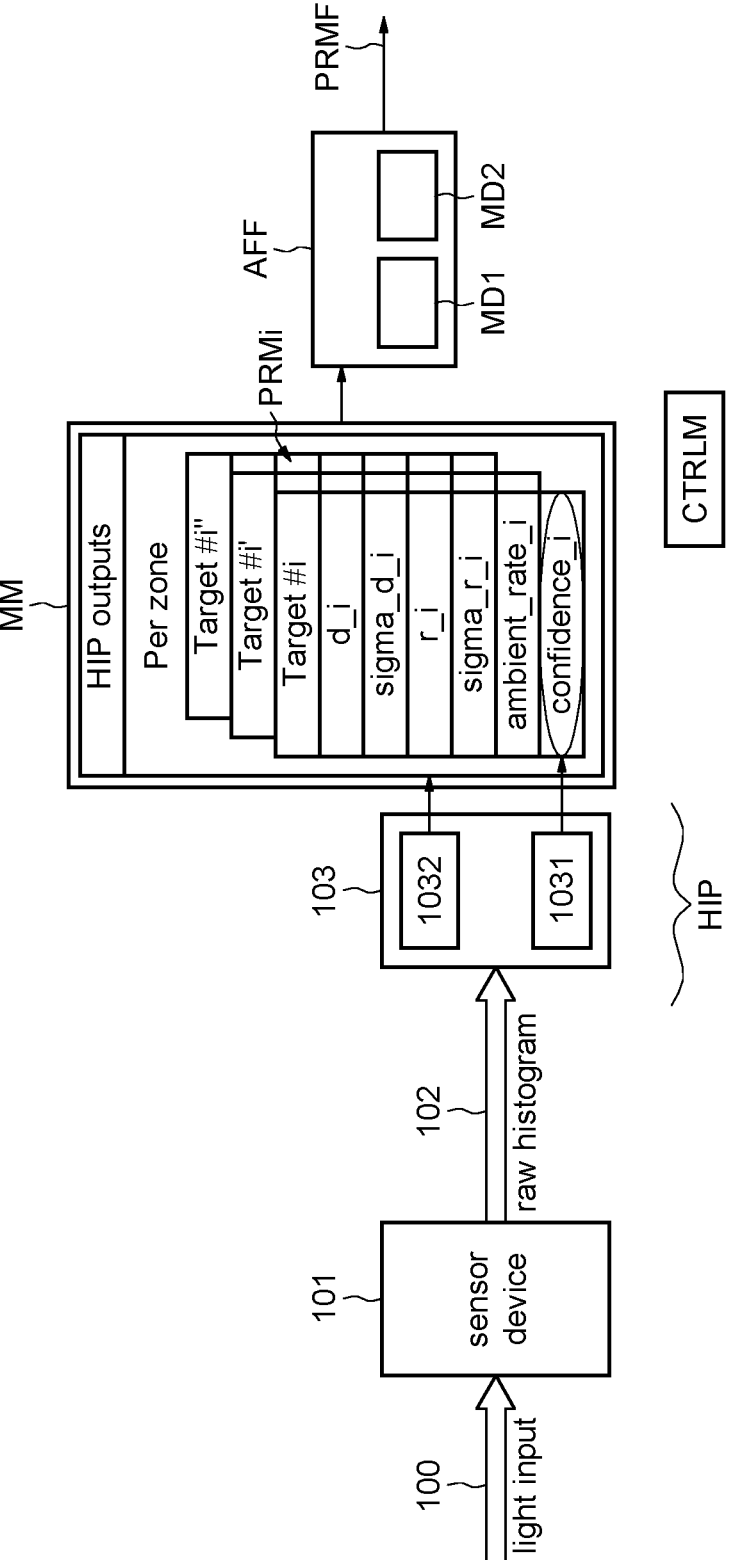
FIG. 1 is a block diagram of an embodiment system.

A schematic view of an example system is shown in FIG. 1. The system includes a sensor device 101 configured to receive a light input 100 coming back from an object after reflecting an incident signal on the object. The sensor device 101 is configured to output a first histogram signal (i.e., raw histogram 102) passed to the first processor 103.

In embodiments, the sensor device 101 is a multiple zones sensor. The first histogram signal permits the detection of successive sets of targets at respective successive instants. The first processor 103 forms a histogram pipe HIP and is configured to determine a current set of current detected targets Target #i, Target #i', Target #i" a current histogram output.

The current histogram output includes, for each current detected target (e.g., Target #i) of the current set, a current group of parameters PRMi stored in a memory MM. In embodiments, the group of parameters PRMi includes a distance or range (d_i), representing the distance between the sensor device and an object within the 'field-of-view' (FoV) of the sensor device, a rate (r_i), an ambient rate, an ambient_rate_i, and a confidence indicator (confidence_i).

The first processor 103 includes a first circuit 1031 for determining the confidence indicators advantageously in firmware (FW) using hardware (HW) histogramming counters. The first processor 103 also includes a second circuit 1032 for determining the other parameters sigma_d_i, sigma_r_i which are, respectively, the standard deviations of d_i and r_i.

The system also includes a second processor AFF configured to perform a matching operation between the current set of detected targets and previous sets of detected targets stored in the memory MM. The second processor AFF is configured to perform a temporal filtering operation of at least one parameter of the current group of parameters of at least some of the current detected targets of the current set based on the result of the matching operation. The temporal filtering operation is advantageously weighted based on at least the confidence indicators.

The second processor AFF delivers filtered parameters PRMF and is configured to process the flickering effect. In embodiments, the second processor includes a first circuit MD1 configured to perform the matching operation and a second circuit MD2 configured to perform the filtering operation. The second circuit may be considered a filter, also referred to as an anti-flicker filter.

In embodiments, the system includes control means CTRLM, such as realized by software, configured to control the first and second processors.

The sensor device 101 and the second circuit 1032 may be those described in U.S. Patent Application No. US2018/0253404A1, which is hereby incorporated by reference herein in its entirety. Some sensor device 101 and the second circuit features are now detailed, and the man skilled in the art can refer to U.S. Patent Application No. US2018/0253404A1 for all useful purposes.

The sensor device 101 may include a light source (e.g., a vertical-cavity surface-emitting laser VCSEL or light-emitting diode LED), a suitable light source driver, an array of single-photon avalanche diode (SPAD) elements, and a time to distance converter (TDC) or histogram generator configured to output the raw histogram signal or raw histogram 102 representing photon event detection counts for a number of time bins.

However, other configurations may be implemented, such as the sensor device having a light source, light source driver and a fast photodiode detector with steered charge, an analog to digital converter (ADC), or the like.

In embodiments, the sensor device 101 includes a generator/driver configured to provide a periodic electric signal (the periodic signal may, for example, be a square-shaped signal, a sine-shaped signal, or any suitable periodic signal). The generator/driver may power the light source, thus generating a modulated light output.

An example of a light source may be a light-emitting diode, or any known lighting device, for example, a laser diode. The signal coming out of the light source is the incident transmitted towards an object and is reflected by the object.

The reflected light signal (i.e., light input 100 of FIG. 1) is detected by the sensor of the sensor device 101, which in the following examples includes an array of SPADs. The SPAD array may integrate several photo detection elements in the form of Single-photon avalanche diodes, or "SPADs" also called Geiger mode avalanche photodiodes. These devices have a reverse-biased p-n junction in which a photo-generated carrier can trigger an avalanche current due to an impact ionization mechanism. SPADs may be designed to operate with a reverse bias voltage well above the breakdown voltage.

The diode is biased to a voltage value larger than its breakdown voltage at an initial time. The reception of a photon in the diode junction area starts an avalanche in the diode, which creates an electric pulse. The diode is then biased back to a voltage smaller than the breakdown voltage so that the SPAD reacts again to the reception of a photon. SPADs can currently be used in cycles having reactivation periods shorter than ten nanoseconds (ns). Thereby, SPADs can be used at high frequency to detect objects at relatively short distances from the measurement device, for example, distances ranging from a few millimeters to several meters. In different embodiments, different ranges may be supported.

Such detection elements may also be rapid charge transfer photodiodes. In embodiments, the signal output by the sensor is phase-shifted from the signal provided by the generator/driver by an angle correlating with the distance to the object.

A Time to Digital Converter (TDC) circuit may be configured to receive the signals generated by the generator/driver and by the sensor and calculate the phase shift (or time difference) between these signals to obtain a distance to the object. The detector (SPAD array) is configured to generate many fast readings in a short time period. Thus, the time to distance converter circuit may be configured to generate a histogram of detected events. For example, with a periodic pulsed system, the detected event arrival instants may be quantized to build up histogram data which may be post-processed to identify the position/distance of multiple targets within the Field of View.

Figure 2:
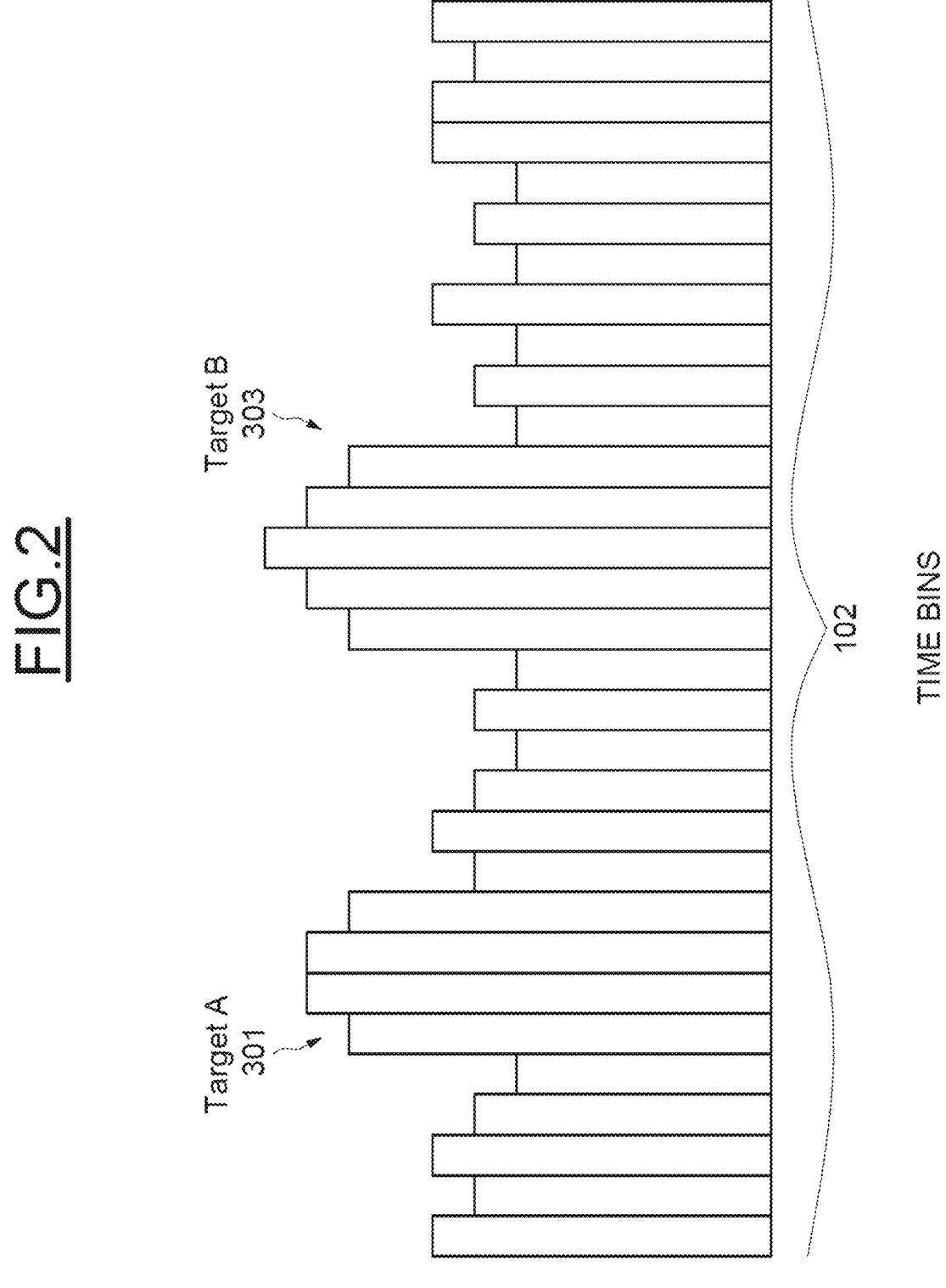
FIG. 2 is an embodiment histogram.

An example of a first generated histogram (i.e., raw histogram 102) is shown in FIG. 2. The raw histogram 102 is shown as a series of bars. Each bar represents a detected event frequency or event count for specific time bins or intervals. As shown, two targets reflections can be seen. The first target A 301 is shown as a peak above an ambient level which occurs earlier than a second target B 303 peak.

A further reference detector within the sensor device is used in some embodiments. The reference detector is configured to receive the light emitted by the light source and is close to the light source. The distance to the object may be determined using the timing difference between the reference detector receiving the light from the light source and the sensor receiving the light from the reflected object.

The histogram data-based distance determination analysis and filtering as shown hereafter is applicable to any time of flight ranging application such as gesture analysis where the range output may be used as an input to algorithms to detect motion of a hand or other object to control an interface, and auto-focus assist where the range output may be used as a guide for an auto-focus scheme to speed up camera focus time.

In some embodiments, the first processor 103 is physically integrated with the sensor device 101. In other words, the processing device is implemented in the same device as the sensor device, for example, by using register transfer level (RTL) synthesis or within an onboard microcontroller unit (MCU) on the sensor device.

In some embodiments, the first processor 103 is logically integrated with the sensor device 101 but implemented on a separate, dedicated processing device.

In some further embodiments, the first processor 103 is implemented as software on a host device configured to receive the output from the sensor device 101.

Figure 3:
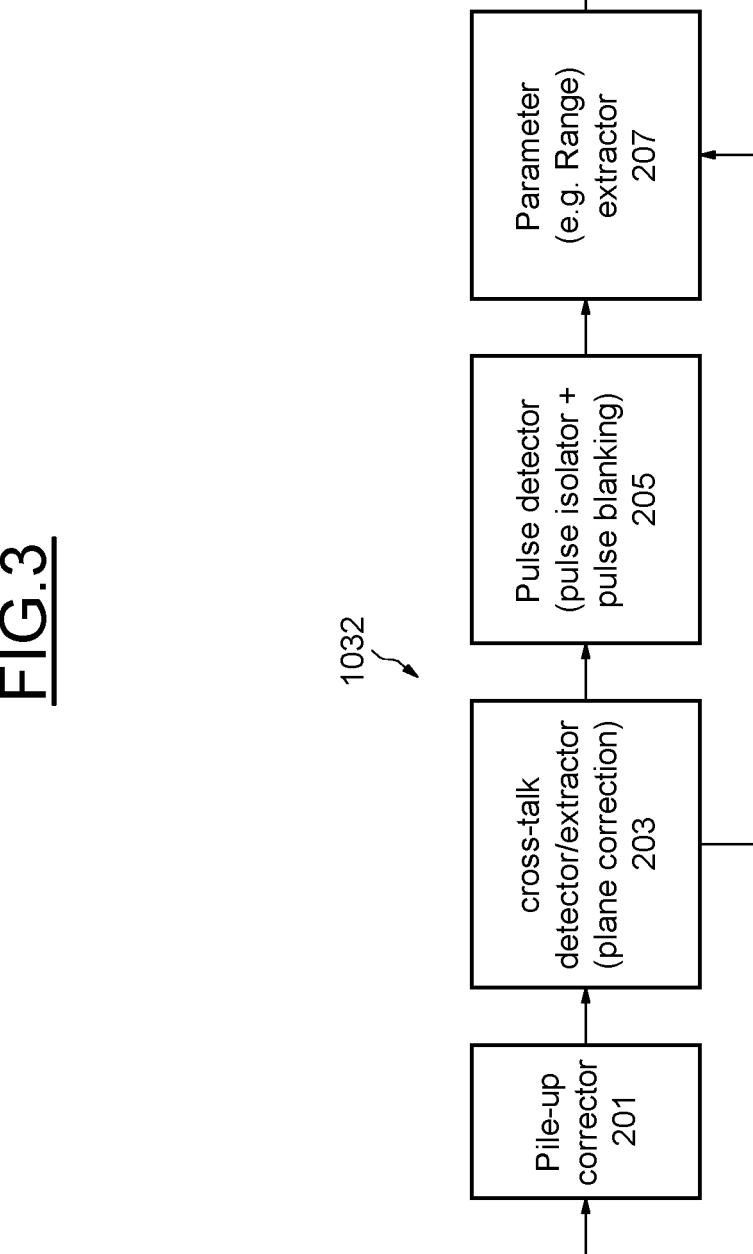
FIG. 3 is a block diagram of a circuit to process the histogram data.

As shown in FIG. 3, the second circuit 1032 of the first processor 103 includes various processing circuits which may process the raw histogram data. In some embodiments, the second circuit 1032 includes some, but not necessarily of the processing circuits described hereafter.

In embodiments, the second circuit 1032 includes a pile-up corrector circuit 201. The pile-up corrector circuit 201 is configured to receive the raw histogram data from the sensor device 101, process the data, and correct for pile-up errors in the histogram data.

In embodiments, the corrected histogram data is passed to a cross-talk detector circuit 203. In some embodiments, the corrected histogram data is passed to a pulse detector circuit, a parameter extractor circuit, or both).

In embodiments, the cross-talk detector circuit 203 is configured to receive the output of the pile-up corrector circuit 201. In some embodiments, where there is no pile-up corrector circuit 201, the cross-talk detector circuit 203 is configured to receive the raw histogram data directly.

The cross-talk detector circuit 203 may thus determine whether the histogram data includes cross-talk components and attempts to at least partially remove these components.

In embodiments, the cross-talk detector circuit 203 outputs the corrected histogram data to the pulse detector circuit or pulse segmenter (PS) circuit 205, the parameter extractor circuit 207, or both.

The pulse detector circuit or pulse segmenter (PS) circuit 205 may be configured to receive the output of the cross-talk detector circuit 203 (or the pile-up corrector circuit 201) and detect and filter (or isolate or blank) pulses within the histogram data. The operation of the pulse detector circuit is described in further detail later in the application. In embodiments, the determined pulses are passed to the parameter extractor circuit 207.

In embodiments, the parameter extractor circuit 207 is configured to receive the output of the cross-talk detector circuit 203, the pulse segmenter (PS) circuit 205, or both and extract suitable parameters, such as the range from the detected pulses within the histogram data. These parameters may be the output.

The first circuit 1031 is configured to determine the confidence indicator and is advantageously coupled to the output of the cross-talk detector circuit 203 or parameter extractor circuit 207 and linked to the pulse segmenter (PS) circuit 205. The confidence indicator of a target may be based on the Z-score of this target in the raw histogram 102.

Figure 4:
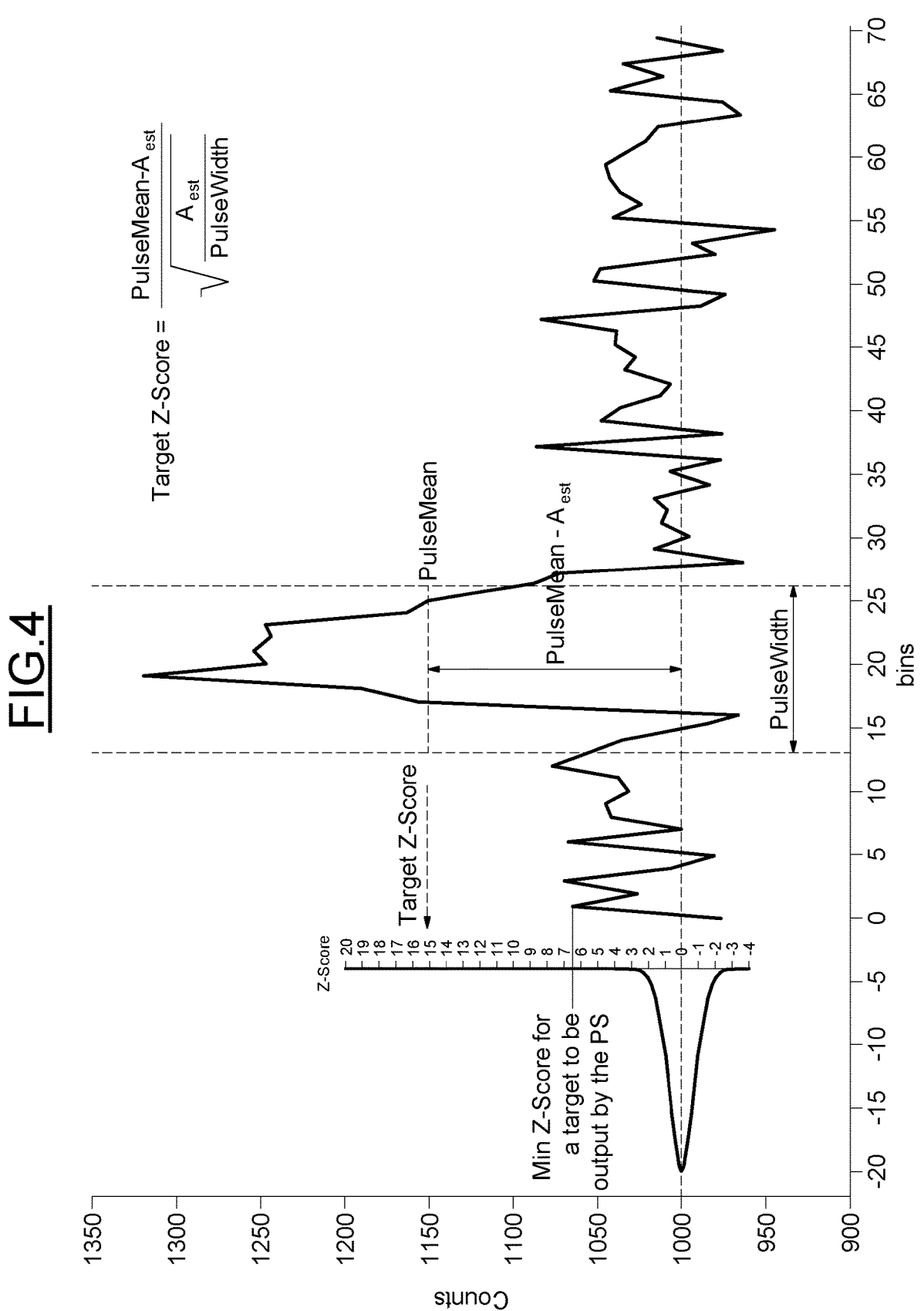
FIG. 4 is a Z-score chart of an embodiment target.

The determination of the Z-score of a target, Target Z-Score, is more particularly illustrated in FIG. 4. In FIG. 4, the Pulse Segmenter detects the pulse reflected by the target.

The Pulse Segmenter detects only one pulse for this target in FIG. 4. More generally, it is quite rare that the Pulse Segmenter detects more than one pulse for the same real target (however, this may happen for a slanted target). And for the Pulse Segmenter, each pulse it detects "is" a target, for which a Target Z-score will be computed.

The number of time bins constituting the detected pulse according to the pulse boundaries determined by the Pulse Segmenter is referred to herein as the PulseWidth.

For the calculation of the Target Z-Score, one considers the average of the event detection counts due to ambient light photons over the time bins constituting the detected pulse. This average follows a probability law (e.g., a Gaussian law) whose mean is Aest and standard deviation is the square root of the division of Aest by PulseWidth.

Aest, called the "ambient per bin," is the estimated mean of the event detection counts per time bin due to ambient light photons. The probability density function of this probability law is shown in FIG. 4, with Aest equal to 1000 counts.

The Target Z-score is the Z-score (also called the standard score) of PulseMean relatively to this probability law, where PulseMean is the average of the event detection counts over the time bins constituting the detected pulse.

PulseMean—Aest is the average target signal (i.e., the average useful signal). It is the estimated average of the event detection counts per time bin due to the reflection on the target of the photons emitted by the light source making part of the device.

Thus, the Target Z-score indicates how far the average target signal is above the standard deviation of the noise (the ambient light level). The Target Z-score is a good indicator of the ability of the Pulse Segmenter to detect the target since the Pulse Segmenter threshold is the minimum Z-score that a target must have to be output by the Pulse Segmenter.

The confidence indicator is an estimate of the correctness of some of the parameters (in particular the range) in the group of the target parameters PRM. The confidence indicator of a target may be the value of the Z-score of the target. It may also be the estimated detection rate of the target computed from the Gauss error function (erf) taking as input the Z-score of the target.

In an embodiment, the Z-score of a target is computed as HIP post-processing in the form of software on a host device, from the group of parameters PRM of the target, the cross-talk rate, the size of the pulse of the target, the effective SPAD count, and some system timing parameters. In this embodiment, the confidence indicator is derived as HIP post-processing from the Z-score.

Figure 5:
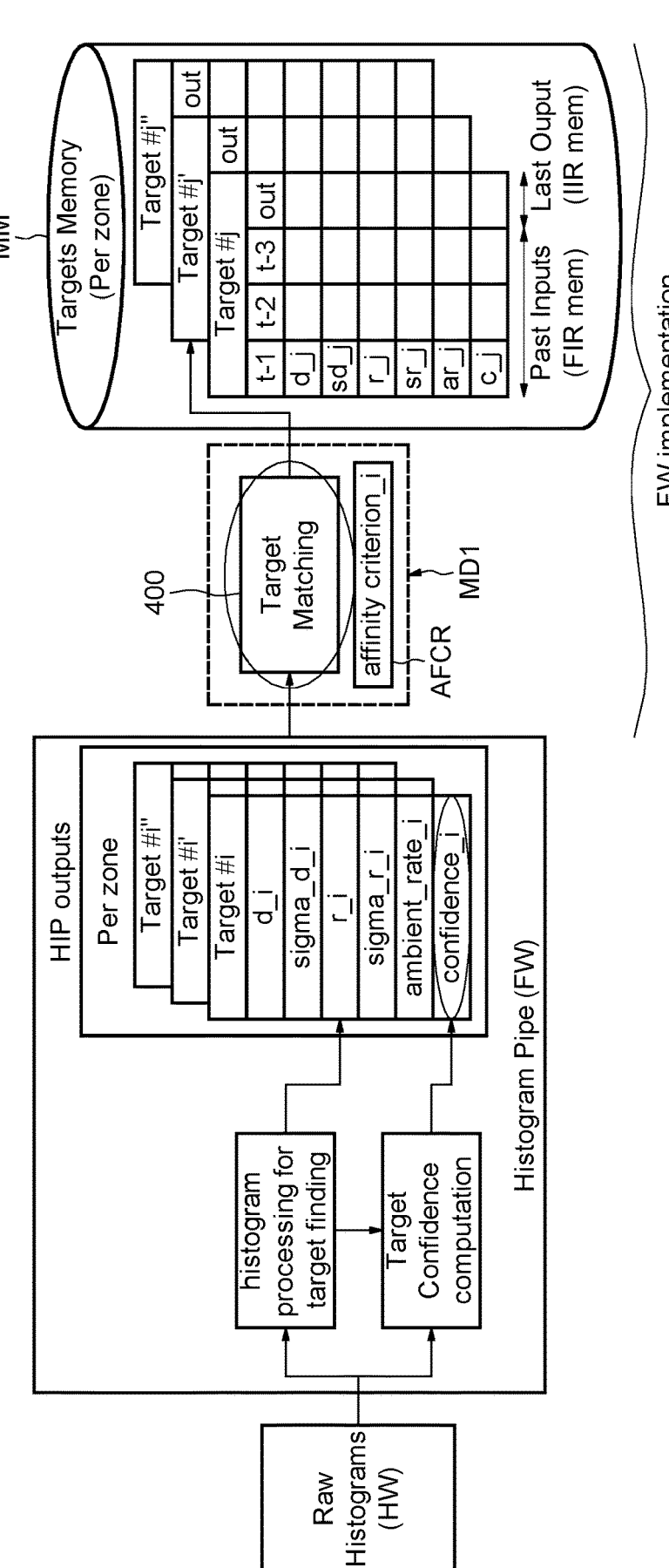
FIG. 5 is a block diagram of an embodiment second processor of the system.
Figure 6:
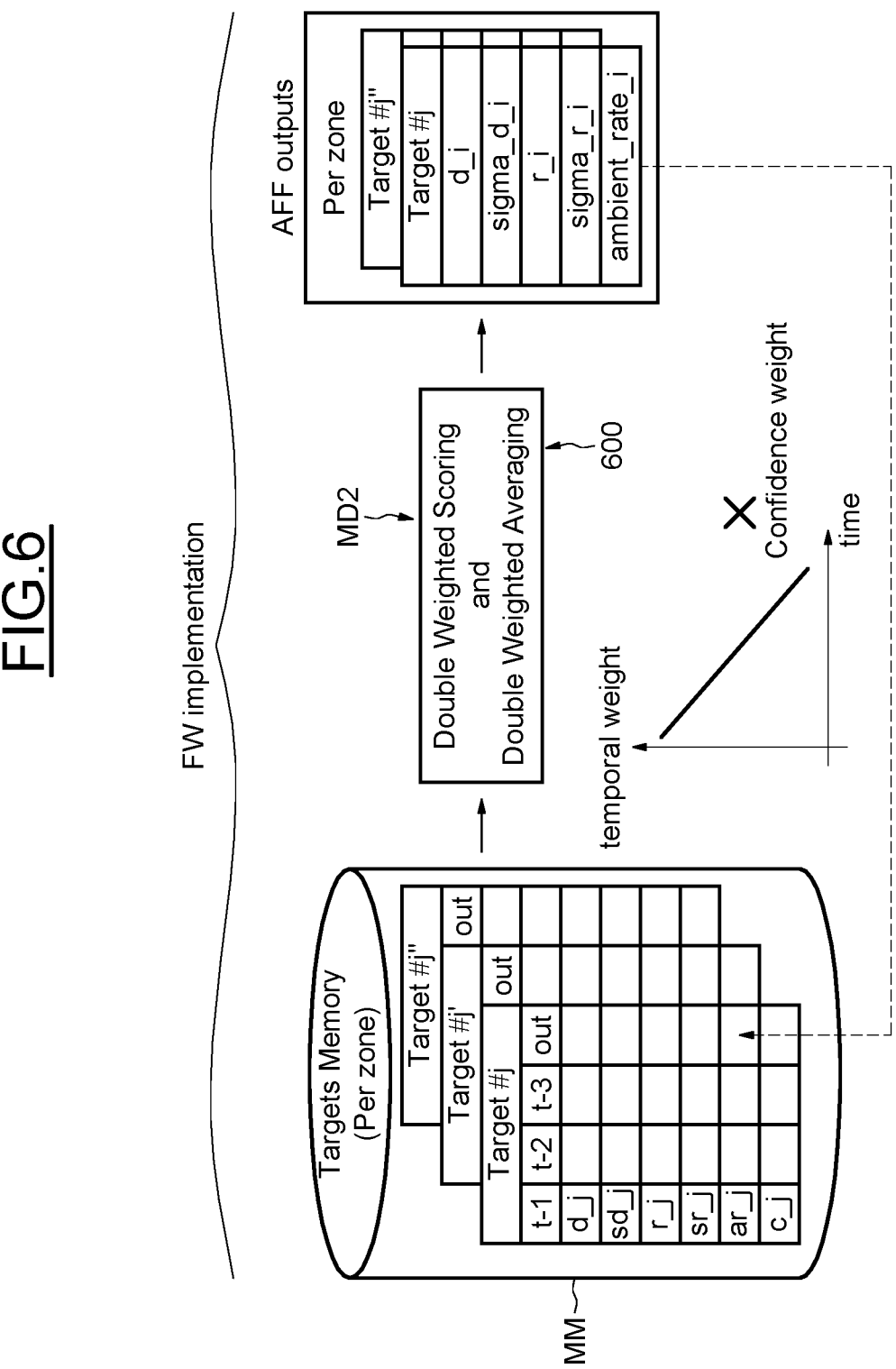
FIG. 6 is a block diagram of an embodiment circuit of the second processor.

We refer now more particularly to FIGS. 5-6 to describe embodiments and operation of the second processor AFF.

As indicated above and illustrated in FIG. 5, the first circuit MD1 of the second processor AFF, implemented here in the firmware FW, is configured to perform, per zone of the sensor device, a matching operation 400 between a current set of detected targets Target #i, Target #i', Target #i" and previous sets of detected targets Target #j, Target #j', Target #j" stored in the memory MM.

In the right part of FIG. 5, sd_j means sigma_dj, sr_j means sigma_rj, ar_j means ambient_rate_j and c_j means confidence_j.

As illustrated diagrammatically in FIG. 6, the second circuit MD2 of the second processor AFF, implemented here in the firmware FW, is configured to perform a temporal filtering operation 600 of at least one parameter of the current group of parameters of at least some of the current detected targets of the current set, based on the result of the matching operation, the temporal filtering operation being advantageously weighted based on at least the confidence indicators. The second circuit MD2 of the second processor AFF delivers the filtered parameters PRMF and processes the flickering effect.

In other words, for performing the temporal filtering operation, the second circuit MD2 implements the anti-flicker filter, and FIG. 6 shows a double weighting operation performed by the anti-flickering filter MD2 of the second processor AFF.

Examples of target matching performed by the first circuit MD1 of the second processor AFF will now be described more in detail.

Matching current set of targets with the one in memory permits handling multiple targets without averaging everything into non-sense output. Generally speaking, the matching operation includes matching the current targets Target #i ($T_i$), with all past realizations (history) of the targets stored in memory MM:

$$\bar{T}_J = \{T_j(t-1), \dots, T_j(t-m)\},$$

where $T$ is the previous targets Target #j, stored in memory MM at instants $t-1, \dots, t-m$.

As illustrated in FIG. 5, the matching operation 400 uses an affinity criterion or function AFCR. An embodiment for an Affinity criterion requirements is shown in FIG. 7, which includes proximity in range—potentially considering the range sigma (standard deviation) (i.e., sigma_r_i), proximity in rate—potentially considering the rate sigma (standard deviation) (i.e., sigma_r_i), and potentially considering their respective confidence (confidence_i) value.

No affinity (infinite affinity value) is returned when proximity/ies exceed/s chosen reasonable value/s. The man skilled in the art will be able to choose these reasonable values. In embodiments, the reasonable values are chosen based on experiments in a controlled environment (for example bench sweeps in a "dark" room) with multiple targets, determining the thresholds relative to the different target parameters and discriminating these targets.

When the affinity function is based on range, we can use the non-linear function:

$$\Delta^p_{Th}(a, b) = \begin{cases} |a-b|^p & \text{if } |a-b| \leq Th \\ \infty & \text{if } |a-b| > Th \end{cases},$$

which corresponds to a distance.

When p=2 and the threshold Th is infinite, this distance is the square of the Euclidian distance.

Other embodiments are possible.

The threshold Th could be set depending on the pulse width, the sigmas (standard deviations), or the combination. The Start and End of pulses (in bins) as detected by the pulse segmenter PS could be used to derive an alternative overlap-based distance. Affinity in rates can also be used, balancing the proximity in ranges d and in rates r by β:

$$Aff_{p,Th}(T_1, T_j) = \beta \sum_{k=1}^m \Delta^p_{TH_d}(d_i, \bar{d}_j) + (1 + \beta) \sum_{k=1}^m \Delta^p_{TH_r}(r_i, \bar{r}_j)$$

In the formula above, $(d_i, \bar{d}_j)$ are the ranges respectively associated with the current target $T_i$ and the previous target $T_j$, and $(r_i, \bar{r}_j)$ are the rates respectively associated with the current target $T_i$ and the previous target $T_j$.

An Affinity based distance matrix $Aff_{p,Th}(t)$ may thus be used for the affinity criterion AFCR in the matching process:

$$Aff_{p,Th}(t) = \begin{bmatrix} Aff_{p,Th}(T_1, \overline{T_1}) & \cdots & Aff_{p,Th}(T_1, \overline{T_{J(t)}}) \\ \vdots & Aff_{p,Th}(T_i, \overline{T_J}) & \vdots \\ Aff_{p,Th}(T_{I(t)}\overline{T_1}) & \cdots & Aff_{p,Th}(T_{I(t)}, \overline{T_{J(t)}}) \end{bmatrix},$$

I(t) is the number of targets output by the histogram pipe (FIG. 5) at instant t and J(t) is the number of valid targets stored in the memory MM at instant t. A suited matching algorithm (the Gale-Shapley algorithm) may be used to best fit current targets with the ones in memory.

Figure 8:
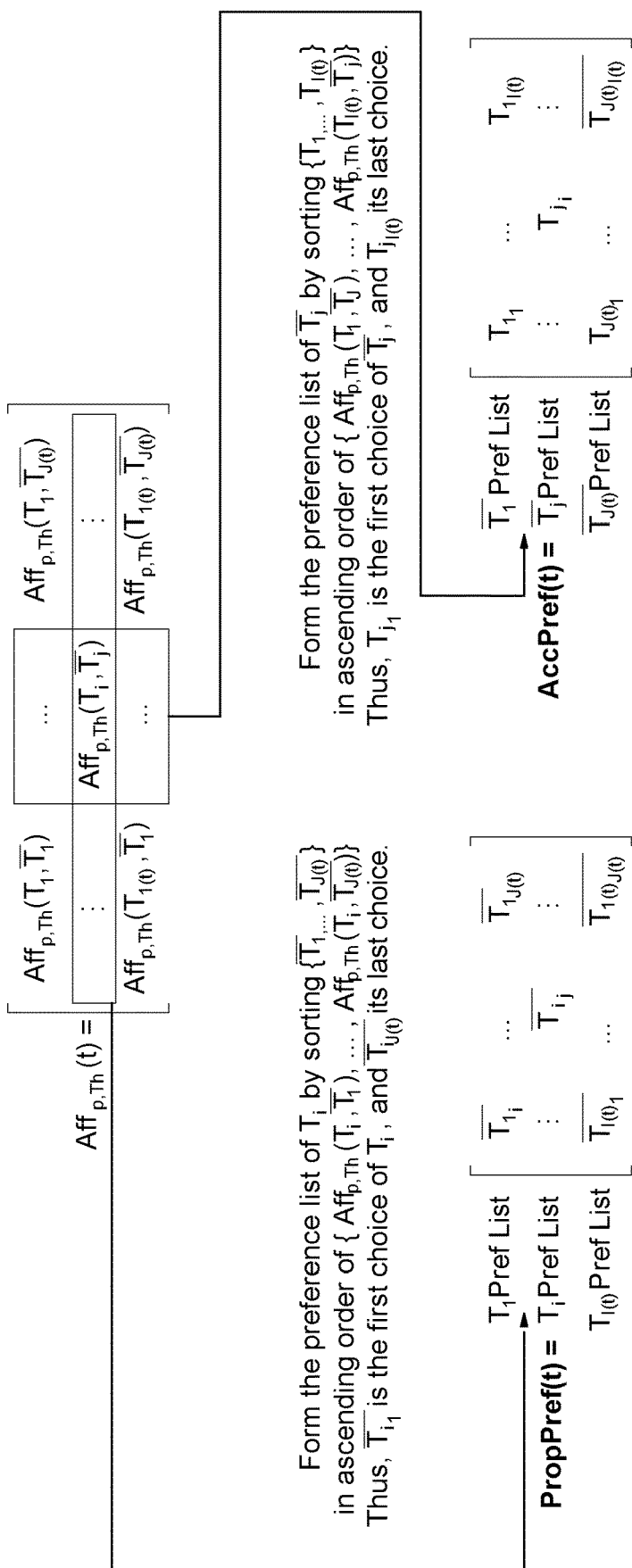
FIG. 8 is an embodiment of proposers' preference matrix and an accepters' preference matrix.

From the affinity matrix $Aff_{p,Th}(t)$, a proposers' preference matrix PropPref(t) and an accepters' preference matrix AccPref(t) are built, as shown in FIG. 8. The "proposers" are the targets output by the histogram pipe at instant t: {$T_1, \ldots, T_{I(t)}$)}. The "accepters" are the valid targets stored in memory MM at instant t: {$T_1, \ldots, \overline{T_{J(t)}}$}

Building the proposers' preference matrix PropPref(t),for example, forming the preference list of $T_i$, includes sorting {$\overline{T_1}, \ldots, \overline{T_{J(t)}}$} in ascending order of {$Aff_{p,Th}(T_i, \overline{T_1}), \ldots, Aff_{p,Th}(T_1, \ldots, \overline{T_{J(t)}})$}. Thus, $\overline{T_{i_1}}$ is the first choice of $T_i$, and $\overline{T_{i_{J(t)}}}$ is the last choice.

Building the accepters' preference matrix AccPref(t), for example, forming the preference list of $\overline{T_j}$ includes sorting {$T_1, \ldots, T_{J(t)}$} in ascending order of {$Aff_{p,Th}(T_1, TJ), \ldots, Aff_{p,Th}(T_{I(t)}, T_J)$}. Thus, $T_{J_1}$ is the first choice of $\overline{T_j}$, and $T_{j_{I(t)}}$ is the last choice. The matching algorithm provides a final set of matches from the proposers' preference matrix PropPref(t) and the accepters' preference matrix AccPref(t).

In the case of the Gale-Shapley matching algorithm, proposers advance on their corresponding row in PropPref (t). Accepters check their corresponding row in AccPref(t) for a possible better match in successive rounds producing intermediate sets of matches until the last round producing the final set of matches.

For the targets which have obtained a final match (some targets may remain single), the Gale-Shapley algorithm ensures that the obtained final set of matches is "stable" in the following sense:

There are no pairs $(T_i, \overline{T_k})$ and $(T_j, \overline{T_i})$, with i≠j and k≠l, for which $T_i$ prefers $\overline{T_l}$ to $\overline{T_k}$ AND $\overline{T_l}$ prefers $T_i$ to $T_j$, or, in other words, for which $Aff_{p,Th}(T_i, \overline{T_l}) < Aff_{p,Th}(T_i, \overline{T_k})$ AND $Aff_{p,Th}(T_i, \overline{T_l}) < Aff_{p,Th}(T_j, \overline{T_l})$.

Examples of anti-flicker filtering performed by the second circuit MD2 of the second processor AFF, will be now described in more detail.

Figure 9:
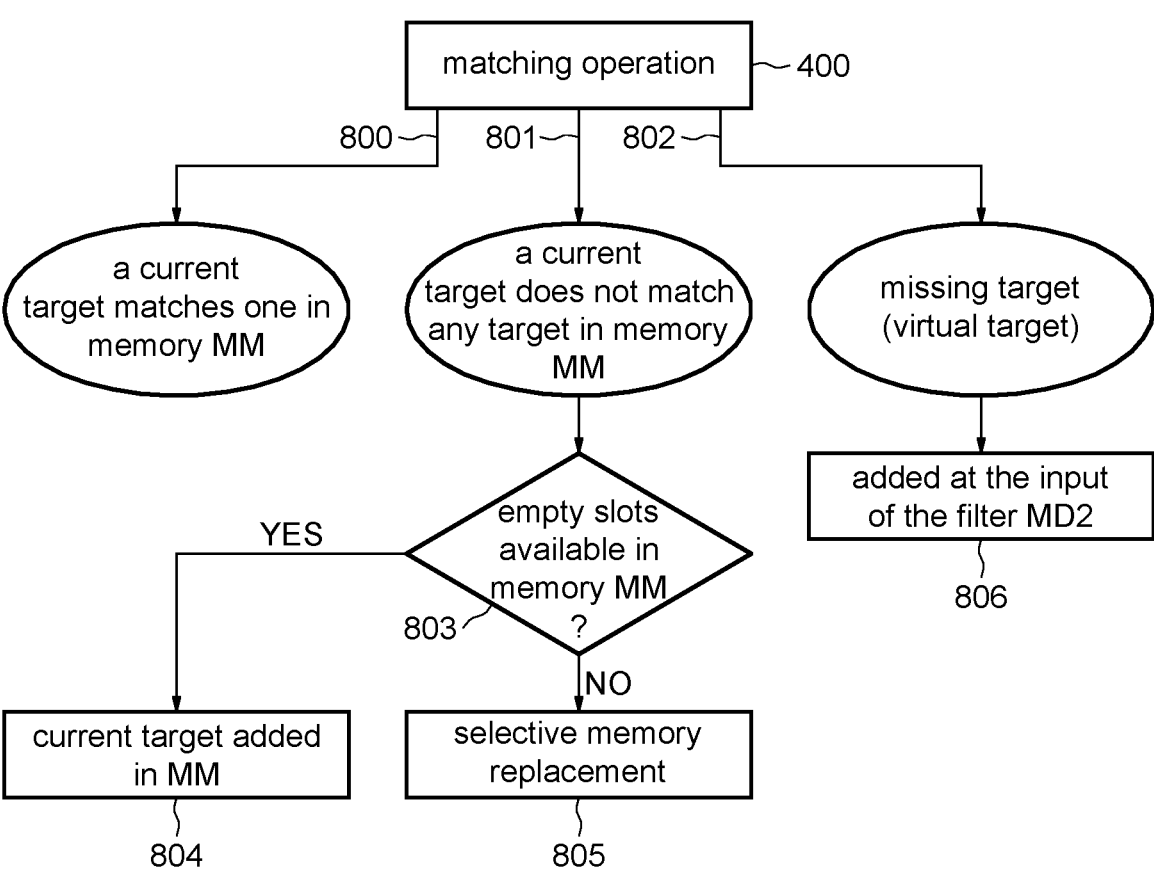
FIG. 9 is a flowchart of an embodiment method.

FIG. 9 illustrates an embodiment flow chart for three possible cases. In a first case, at step 800, a current target matches one in the memory MM. This corresponds to a nominal case for the anti-flicker filter MD2 of the second processor AFF.

In a second case, at step 801, a current target does not match any target in memory. This corresponds to, for example, an appearing target or glitch. At steps 803 and 804, this appearing target may be added to the memory MM if empty slots are available.

Otherwise, at step 805, selective memory replacement of a stored target by this appearing target may be performed based on the confidence indicators.

At step 802, a previous target in memory is not matched in the current set of detected targets. This corresponds to a missing target or a virtual target. At step 806, this virtual target is added at the input of the filter to fill the hole for filtering.

In embodiments, the addition and replacement operations may be performed by the control means CTRLM.

In the case of a missing target (e.g., virtual target), there are several possible causes for a target in memory to be missing at some instant. First, to achieve low latency, the target has actually disappeared from the scene. The filter MD2 of the second processor AFF is advantageously as reactive as possible and discards this target as soon as possible from memory. Second, to achieve high stability, the target is weak and is not detected from time to time by the pulse segmenter PS. The anti-flicker filter MD2 advantageously keeps it. Third, to reach both goals (i.e., low latency and stability), one takes into account the past confidence of the target in memory. More precisely, a virtual target is added to the filter inputs with a confidence that is very low (even below the PS threshold-even negative) if one was very confident on its past realization, close to the previous confidence level in memory if it was low (close to the PS level). There is an additional benefit that the filtering process is streamlined and no branching or special case is to be handled.

Figure 10:
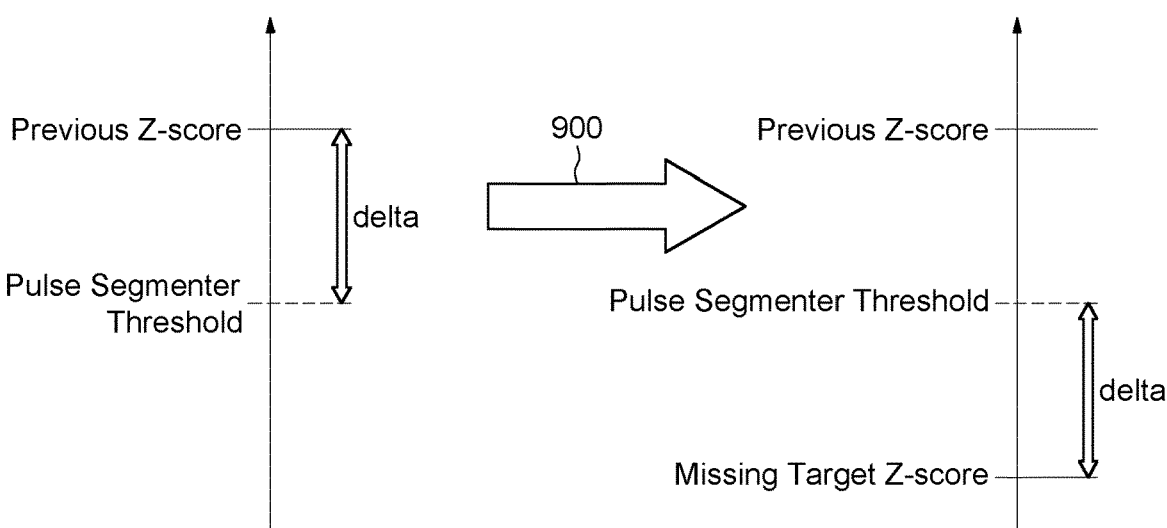
FIGS. 10 and 11 are diagrams of mirroring Z-score embodiments.

As illustrated in FIG. 10, an embodiment includes a mirroring Z-score (with or without offset). More precisely, the previous value Z-score (determined as illustrated in FIG. 4) of the previous target, which corresponds to a missing target or a virtual target, is above the pulse segmenter threshold with a difference equal to delta.

The Z-score given to the missing target (virtual target) is thus equal to the pulse segmenter threshold minus delta. In such a case, the virtual target is added to the filter inputs with a missing Target Z-score and thus with a confidence that is very low because one was very confident on its past real- ization (previous Z-score well above the PS threshold, step 900).

Figure 11:
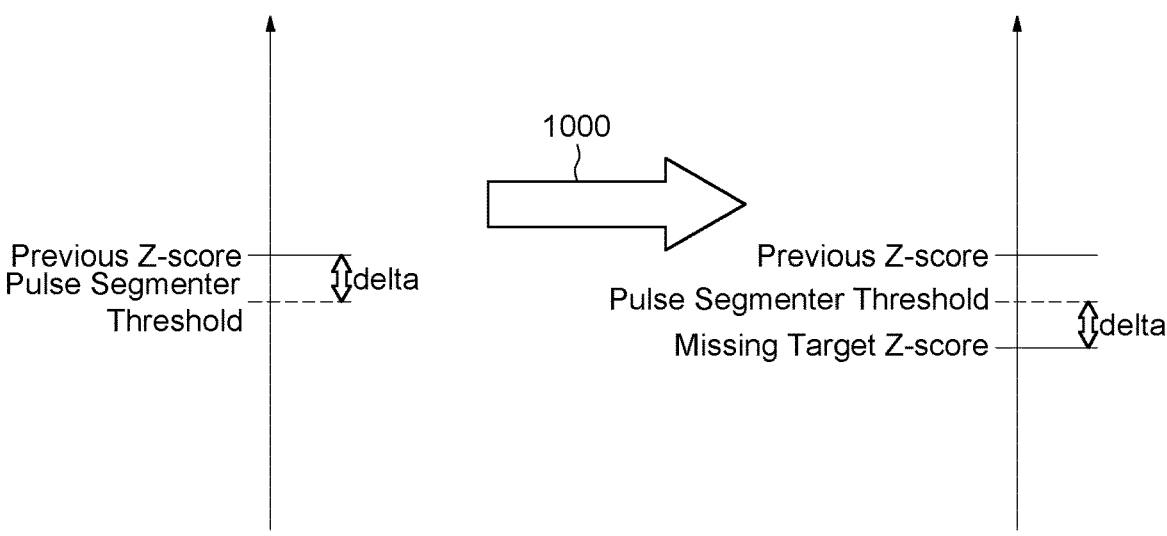

For example, the previous Z-score can be equal to 1000 (i.e., very high confidence), which results in a typical PS threshold equal to 6.1, a delta equal to 993.9 (1000–6.1), and a missing target Z-score equal to –987.8 (6.1–993.9). Thus, added to the filter input, the virtual target exhibits a very low Z-score that will greatly influence the filtered confidence, making the target disappear quickly Another embodiment illustrated in FIG. 11 of a mirroring Z-score (with or without offset), but with a value of delta smaller than the value of delta of FIG. 10. In such a case, the virtual target is added to the filter inputs with a missing Target Z-score and thus with a confidence close to the previous confidence level in memory because it was low (close to the PS threshold, step 1000).

For example, the previous Z-score can be equal to 6.5 (i.e., low confidence, close to the PS threshold), which results in a typical PS threshold equal to 6.1, in a delta equal to 0.4 (6.5–6.1), and a missing target Z-score equal to 5.7 (6.1–0.4). In such a case, added to the filter input, the virtual target exhibits a Z-score close to the memory MM, smooth- ing the target output (i.e., healing the flicker).

Figure 12:
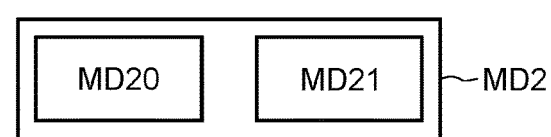
FIG. 12 is a block diagram of an embodiment anti-flicker filter.

As illustrated diagrammatically in FIG. 12, the anti-flicker filter MD2 may include an IIR (Infinite Impulse Response) filter MD20 and an FIR (Finite Impulse Response) filter MD21. In embodiments, the IIR filter MD20 is disabled in the presence of a missing target.

FIG. 13 illustrates a weighted filter MD2 using a weighted average on the confidence indicator $c_j$. The confidences include potentially the mirrored one (for virtual target). The filter MD2 includes the IIR filter MD20, a recursive filter, and the FIR filter MD21, a direct filter. The filtered confi- dence $\overline{c_i(t)}$ is given by the formula:

$$\overline{c_i(t)} = \alpha \times c_i(\overline{t-1}) + (1-\alpha) \times \frac{1}{\sum\limits_{k=1}^{m} w_k} \sum\limits_{k=1}^{m} w_k c_j(t-k),$$

where m is the number of coefficients of the filter and $w_k$ are the weights.

The direct filter provides a direct temporal average with weights having decreasing importance over time—for example, $w_1=4$, $w_2=2$ and $w_3=w_4=1$.

FIG. 14 illustrates a double-weighted filtering operation 1300 performed by the filter MD2 using a double-weighted average on the target characteristics: range. The confidences include potentially the mirrored one (for virtual target).

The filter MD2 includes the IIR filter MD20, a recursive filter, and the FIR filter MD21, a direct filter. The confidence direct average is based here on $c_j(t-k)$ and includes poten- tially virtual target(s). The filtered range $\overline{d_i(t)}$ is given by the formula, in which only real past targets are taken into account:

$$\overline{d_i(t)} = \alpha \times d_i(\overline{t-1}) + (1-\alpha) \times \frac{1}{\sum\limits_{k=1}^{m} w_k c_j(t-k)} \sum\limits_{k=1}^{m} w_k c_j(t-k) d_j(t-k).$$

The direct filter provides a direct temporal average with weights having decreasing importance over time—for example, $w_1=4$, $w_2=2$ and $w_3=w_4=1$.

Embodiments of the invention permit to obtain in par- ticular the following results and advantages of drastically reducing the flicker at the output of the Histogram Pipe, for example, reduction by around 90%, keeping the latency to a reasonable level, for example, 2 frame delay (for appear- ance/disappearance) in the dark, two frame delay for an appearance at 2kLux, four frame latency for disappearance in the worst case, offering a tunable trade-off between the latency and the stability, handling smoothly multiple targets, helping to detect false long tail targets, and no reduction of the spatial reduction.

Figure 15:
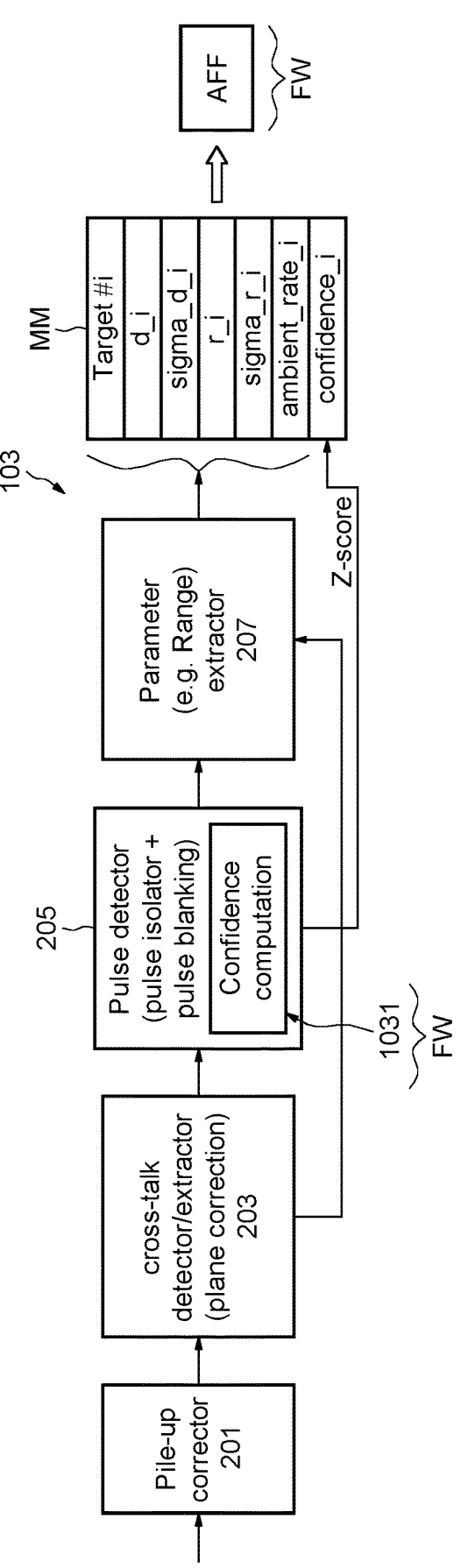
FIG. 15 is a block diagram of an embodiment system.

As indicated above and illustrated in FIG. 15, according to an advantageous implementation, the first circuit 1031 of the first processor 103 and the second processor AFF may be integrated into the firmware FW.

Figure 16:
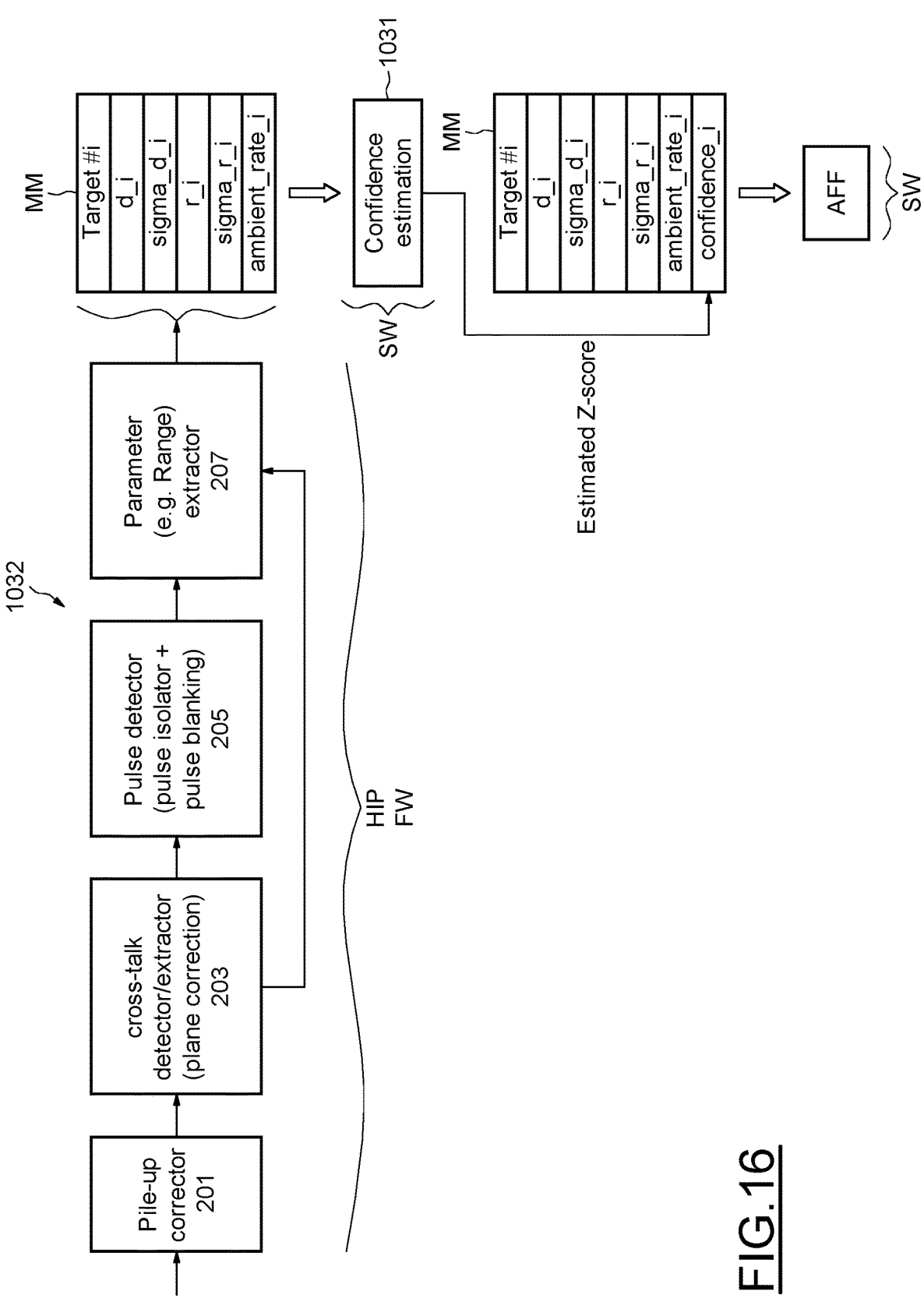
FIG. 16 illustrates diagrammatically embodiments of the invention.

According to a variant illustrated in FIG. 16, the second circuit 1032 is integrated into the FW, but the first circuit 1031 and the second processor AFF are integrated into the software SW which allows backward compatibility as the histogram pipe HIP is not modified.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same func- tion or achieve substantially the same result as the corre- sponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclo- sure.

What is claimed is:

1. A method, comprising:

identifying successive sets of targets at respective suc- cessive instants from a first histogram signal delivered by a sensor device, the identifying of the successive set of targets comprising identifying pulses in the first histogram signal that exceed a detection threshold, wherein the sensor device comprises a time-of-flight (ToF) sensor, the first histogram signal representing photon event detection counts for a number of time bins;

determining a histogram output for a current set of the successive sets of targets, the histogram output having a group of parameters stored in memory for each current set, each group of parameters having a confi- dence indicator, wherein a group of parameters for the current set includes a rate parameter, an ambient rate parameter, and a distance parameter;

performing a matching operation between the current set of the successive sets of targets and previous sets of the successive sets of targets stored in the memory;

performing a filtering operation of at least one parameter of the group of parameters of the current set based on results of the matching operation, the filtering operation weighted based on at least confidence indicators of the current set of targets and the previous sets of the successive sets of targets; and generating a stabilized target detection output with reduced temporal flicker effects from filtered parameters.

2. The method of claim 1, wherein the confidence indicator of a current set is based on a target z-score in the first histogram signal.

3. The method of claim 1, wherein the matching operation comprises using an affinity criterion having a condition based on the rate parameter, the distance parameter, or the confidence indicator.

4. The method of claim 3, wherein the affinity criterion includes an affinity-based distance matrix.

5. The method of claim 1, wherein the current set of the successive targets matches a previous set of the successive targets stored in the memory at the end of the matching operation.

6. The method of claim 1, wherein the current set of the successive targets does not match a previous set of the successive targets stored in the memory at the end of the matching operation.

7. The method of claim 6, wherein the current set of the successive targets is added to the memory based on the availability of empty slots in memory.

8. The method of claim 1, wherein the method further comprises performing a selective memory replacement based on confidence indicators for storing the current set of the successive targets.

9. The method of claim 1, wherein a previous set of the successive targets in the memory is not matched in the current set of successive targets and, based thereon, a virtual target is added to the input of the filtering operation with a new confidence indicator.

10. The method of claim 9, wherein the new confidence indicator is very low in response to high confidence in its corresponding previous target.

11. The method of claim 9, wherein the new confidence indicator is close to a confidence indicator of the previous set of the successive targets in response to the confidence indicator of the previous set of the successive targets is low.

12. The method of claim 1, further comprising a double weighted filtering operation based on target parameters and confidence indicator.

13. The method of claim 1, wherein the sensor device includes a direct time-of-flight (ToF) device.

14. A system, comprising:

a sensor device configured to transmit a first histogram signal to identify successive sets of targets at respective successive instants, the identifying of the successive set of targets comprises identifying pulses in the first histogram signal that exceed a detection threshold, wherein the sensor device comprises a time-of-flight (ToF) sensor, the first histogram signal representing photon event detection counts for a number of time bins;

a first processor configured to determine a histogram output for a current set of the successive sets of targets, the histogram output having a group of parameters stored in memory for each current set, each group of parameters having a confidence indicator; and a second processor configured to:

perform a matching operation between the current set of the successive sets of targets and previous sets of the successive sets of targets stored in the memory, wherein a group of parameters for the current set includes a rate parameter, an ambient rate parameter, and a distance parameter, perform a filtering operation of at least one parameter of the group of parameters of the current set based on results of the matching operation, the filtering operation weighted based on at least confidence indicators of the current set of targets and the previous sets of the successive sets of targets, and generate a stabilized target detection output with reduced temporal flicker effects from filtered parameters.

15. The system of claim 14, wherein the confidence indicator of a current set is based on a target z-score in the first histogram signal.

16. The system of claim 14, wherein the matching operation comprises using an affinity criterion having a condition based on the rate parameter, the distance parameter, or the confidence indicator.

17. The system of claim 16, wherein the affinity criterion includes an affinity-based distance matrix.

18. The system of claim 14, wherein the current set of the successive targets matches a previous set of the successive targets stored in the memory at the end of the matching operation.

19. The system of claim 14, wherein the current set of the successive targets does not match a previous set of the successive targets stored in the memory at the end of the matching operation.

20. The system of claim 19, wherein the current set of the successive targets is added to the memory based on the availability of empty slots in memory.

21. The system of claim 14, wherein the second processor is further configured to perform a selective memory replacement based on confidence indicators for storing the current set of the successive targets.

22. The system of claim 14, wherein a previous set of the successive targets in the memory is not matched in the current set of successive targets and, based thereon, a virtual target is added to the input of the filtering operation with a new confidence indicator.

23. The system of claim 22, wherein the new confidence indicator is very low in response to high confidence on its corresponding previous target.

24. The system of claim 22, wherein the new confidence indicator is close to a confidence indicator of the previous set of the successive targets in response to the confidence indicator of the previous set of the successive targets is low.

25. The system of claim 14, wherein the second processor is further configured to perform a double weighted filtering operation based on target parameters and confidence indicator.

26. The system of claim 14, wherein the sensor device includes a direct time-of-flight (ToF) device.

27. The system of claim 14, wherein the first processor and the second processor are implemented as firmware.

28. The system of claim 14, wherein the first processor includes a first circuit configured to determine the confidence indicators and a second circuit configured to determine the other parameters, the first circuit and the second processor being implemented as software and the second circuit being implemented as firmware.

29. A device, comprising:

a sensor device configured to transmit a first histogram signal to identify successive sets of targets at respective successive instants, the identifying of the successive set of targets comprising identifying pulses in the first histogram signal that exceed a detection threshold, wherein the sensor device comprises a time-of-flight (ToF) sensor, the first histogram signal representing photon event detection counts for a number of time bins;

a non-transitory memory storage comprising instructions; and a first processor in communication with the non-transitory memory storage and the sensor device, wherein the instructions, when executed by the first processor, cause the first processor to determine a histogram output for a current set of the successive sets of targets, the histogram output having a group of parameters stored in memory for each current set, each group of parameters having a confidence indicator, wherein a group of parameters for the current set includes a rate parameter, an ambient rate parameter, and a distance parameter; and a second processor in communication with the first processor, the non-transitory memory storage, and the sensor device, wherein the instructions, when executed by the second processor, cause the second processor to:

perform a matching operation between the current set of the successive sets of targets and previous sets of the successive sets of targets stored in the memory, perform a filtering operation of at least one parameter of the group of parameters of the current set based on results of the matching operation, the filtering operation weighted based on at least confidence indicators of the current set of targets and the previous sets of the successive sets of targets, and generate a stabilized target detection output with reduced temporal flicker effects from filtered parameters.

30. The device of claim 29, wherein the matching operation comprises using an affinity criterion having a condition based on the rate parameter, the distance parameter, or the confidence indicator.

31. The device of claim 30, wherein the affinity criterion includes an affinity-based distance matrix.

* * * * *